US012562293B2

(12) United States Patent　　(10) Patent No.:　US 12,562,293 B2

Iguchi et al.　　(45) **Date of Patent:　\*Feb. 24, 2026**

---

(54) DIELECTRIC COMPOSITION AND ELECTRONIC COMPONENT

(71) Applicant: TDK CORPORATION, Tokyo (JP)

(72) Inventors: Toshihiro Iguchi, Tokyo (JP); Tetsuhiro Takahashi, Tokyo (JP); Hiroki Akiba, Tokyo (JP); Ryota Nomura, Tokyo (JP)

(73) Assignee: TDK CORPORATION, Tokyo (JP)

( \* ) Notice: Subject to any disclaimer, the term of this patent is extended or adjusted under 35 U.S.C. 154(b) by 1071 days.

This patent is subject to a terminal disclaimer.

(21) Appl. No.: 17/557,824

(22) Filed: Dec. 21, 2021

(65) Prior Publication Data

US 2022/0230776 A1　Jul. 21, 2022

(30) Foreign Application Priority Data

Jan. 20, 2021　(JP) ................................. 2021-007206

(51) Int. Cl.
| | |
|---|---|
| *H01B 3/12* | (2006.01) |
| *C04B 35/495* | (2006.01) |
| *H01G 4/12* | (2006.01) |

(52) U.S. Cl.
CPC ............. *H01B 3/12* (2013.01); *C04B 35/495* (2013.01); *H01G 4/1254* (2013.01); *C04B 2235/3215* (2013.01); *C04B 2235/3251* (2013.01)

(58) Field of Classification Search
CPC . H01B 3/12; C04B 35/495; C04B 2235/3215; C04B 2235/3251; C04B 2235/3213; H01G 4/1254
See application file for complete search history.

(56) References Cited

U.S. PATENT DOCUMENTS

| | | | |
|---|---|---|---|
| 11,873,255 B2 * | 1/2024 | Iguchi | H01G 4/1227 |
| 2017/0096371 A1 | 4/2017 | Fujii et al. | |
| 2018/0282229 A1 | 10/2018 | Yamazaki et al. | |
| 2022/0085144 A1 * | 3/2022 | Lee | C23C 16/45553 |
| 2023/0145549 A1 * | 5/2023 | Iguchi | H01G 4/1209 501/135 |
| 2023/0253154 A1 * | 8/2023 | Takahashi | H01G 4/1209 501/135 |

FOREIGN PATENT DOCUMENTS

| | | |
|---|---|---|
| CN | 108138307 A | 6/2018 |
| CN | 108395215 A | 8/2018 |
| JP | S63-994 A | 1/1988 |
| JP | H01-105404 A | 4/1989 |
| JP | 2017-071523 A | 4/2017 |

OTHER PUBLICATIONS

Lu, Li, et al. "Annealing and Composition Effects of (BaxSr1-x) Ta2O6 Thin Films Fabricated by Sol-Gel Method." Japanese Journal of Applied Physics 49.9S (2010): 09MA14. (Year: 2010).*

* cited by examiner

*Primary Examiner* — Cameron K Miller

(74) *Attorney, Agent, or Firm* — Oliff PLC

(57) ABSTRACT

In order to provide a dielectric composition having high relative permittivity at a wide range of temperatures, the main component of a dielectric composition includes strontium and tantalum.

6 Claims, 4 Drawing Sheets

FIG. 4
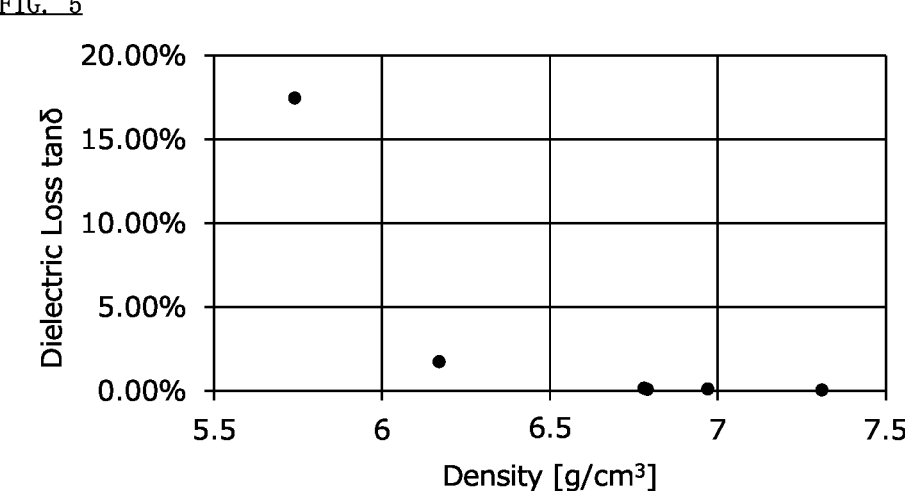
FIG. 5
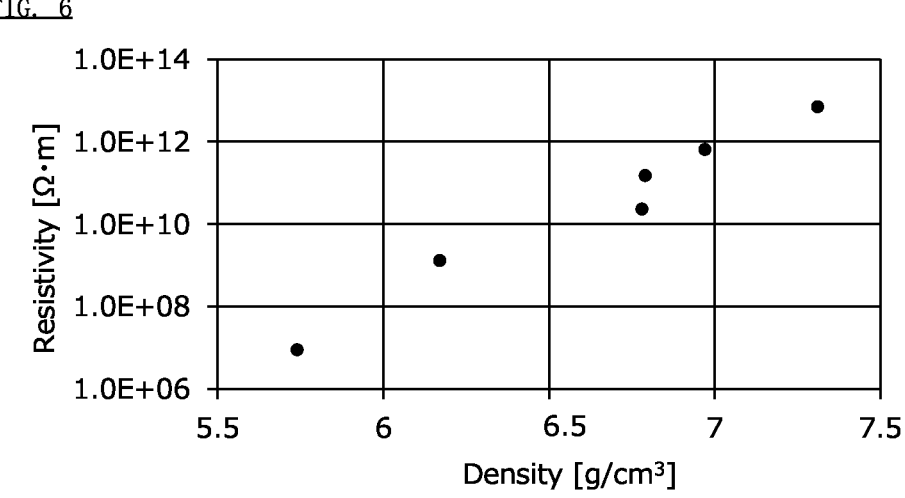
FIG. 6

DIELECTRIC COMPOSITION AND ELECTRONIC COMPONENT

BACKGROUND OF THE INVENTION

The present invention relates to a dielectric composition and an electronic component.

A dielectric composition having high relative permittivity at a wide range of temperatures has been wanted for electronic components, such as those for vehicles.

BRIEF SUMMARY OF THE INVENTION

The present invention has been achieved under such circumstances. It is an object of the invention to provide a dielectric composition having high relative permittivity at a wide range of temperatures.

The main component of the dielectric composition according to the present invention includes strontium and tantalum.

The dielectric composition according to the present invention can achieve high relative permittivity at a wide range of temperatures.

The main component preferably includes barium.

The dielectric composition according to the present invention preferably and substantially does not include titanium, niobium, an alkali metal, and lead.

Some dielectric compositions with high relative permittivity are $BaTiO_3$ whose main component is titanium (Ti), $(Sr,Ba)Nb_2O_6$ whose main component is niobium (Nb), $(Na,K)NbO_3$ including an alkali metal, and $Pb(Zr,Ti)O_3$ including Pb.

Substantially excluding titanium and niobium, the dielectric composition according to the present invention is less likely to have oxygen vacancy defects. This means that changes in the valences of the elements constituting the dielectric composition are controlled. The valences of the elements constituting the dielectric composition are less likely to change when reduction firing is performed in order to fire the dielectric composition together with a base metal. Consequently, reduction of the resistivity of the dielectric composition seems to be prevented to enable high resistivity at a wide range of temperatures, and the dielectric loss of the dielectric composition seems to be lowered.

Because the dielectric composition according to the present invention substantially excludes an alkali metal, composition deviation of the dielectric composition and dirt on a furnace due to alkali metal evaporation can be prevented.

The dielectric composition according to the present invention substantially excludes lead, whose use is controlled by Restriction of Hazardous Substances Directive (RoHS).

The main component is preferably expressed by $\{Ba_xSr_{(1-x)}\}_mTa_4O_{12}$, and the value of x is preferably 0.75 or smaller. This enables higher density and resistivity as well as lower dielectric loss corresponding to the increase of the relative permittivity.

The value of x is more preferably 0.1-0.75 (both inclusive, the same applies hereafter), which enables still higher relative permittivity.

The value of m is preferably 1.9-2.1, which enables still higher density and resistivity as well as still lower dielectric loss corresponding to the increase of the relative permittivity.

The crystal system of the crystal of the main component is preferably tetragonal.

An electronic component according to the present invention comprises the dielectric composition.

BRIEF DESCRIPTION OF THE DRAWING(S)

FIG. 4 is a chart showing the relationship between the density and relative permittivity of dielectric compositions.

FIG. 5 is a chart showing the relationship between the density and dielectric loss of the dielectric compositions.

FIG. 6 is a chart showing the relationship between the density and resistivity of the dielectric compositions.

DETAILED DESCRIPTION OF THE INVENTION

First Embodiment

<Multilayer Ceramic Capacitor>

Figure 1:
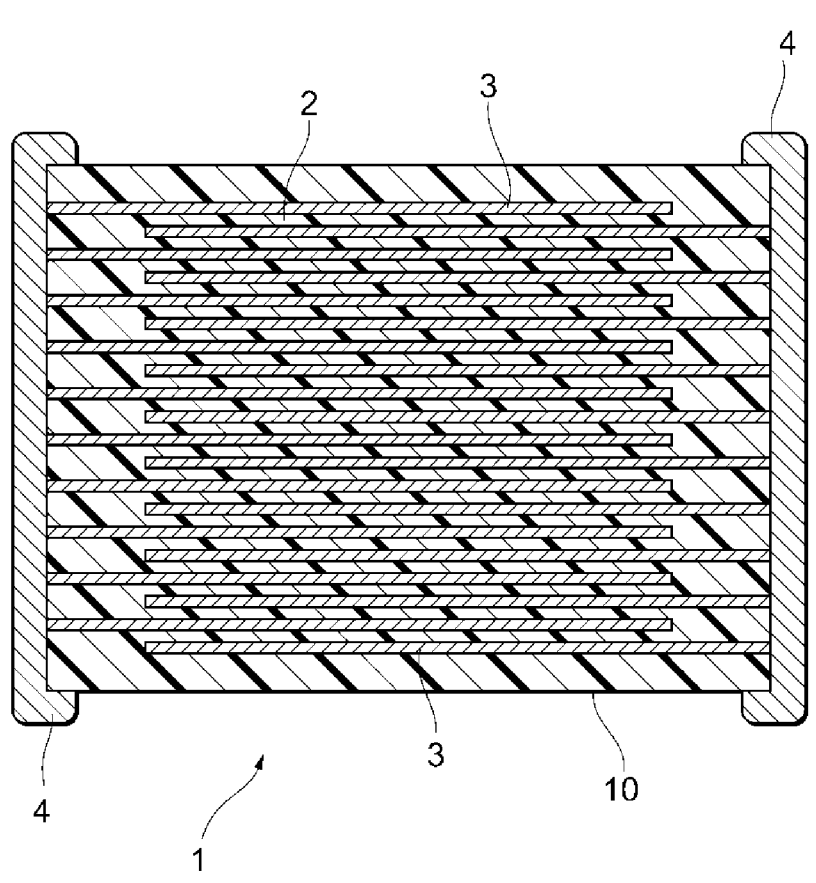
FIG. 1 is a schematic cross-sectional view of a multilayer ceramic capacitor according to an embodiment of the present invention.

FIG. 1 shows a multilayer ceramic capacitor 1, an example of an electronic component according to the present embodiment. The multilayer ceramic capacitor 1 includes an element body 10 having dielectric layers 2 and internal electrode layers 3 stacked alternately. A pair of external electrodes 4 is formed on both ends of the element body 10 and electrically connects with the internal electrode layers 3 alternately arranged inside the element body 10. The element body 10 may have any shape, but normally has a rectangular parallelepiped shape. The dimensions of the element body 10 are not limited and are appropriately determined based on usage.

<Dielectric Layers>

The dielectric layers 2 are composed of a dielectric composition according to the present embodiment mentioned below.

The thickness of the dielectric layers 2 per one layer (inter-layers thickness) is not limited and is determined freely based on desired characteristics, usage, etc. The inter-layers thickness is normally preferably 30 μm or less, more preferably 15 μm or less, and still more preferably 10 μm or less.

<Internal Electrode Layers>

In the present embodiment, the internal electrode layers 3 are stacked so that their ends are alternately exposed to the two end surfaces of the element body 10 facing each other.

The internal electrode layers 3 may contain any conductive material. Some noble metals that may be used as the conductive material are palladium (Pd), platinum (Pt), and silver-palladium (Ag—Pd) alloy. Some base metals that may be used as the conductive material are nickel (Ni), nickel based alloy, copper (Cu), and copper based alloy. A maximum of about 0.1 mass % of various fine components, such as phosphorus (P) and/or sulfur (S), may be contained in nickel, nickel based alloy, copper, or copper based alloy. The internal electrode layers 3 may be formed using a commercially available electrode paste. The thickness of the internal electrode layers 3 is determined appropriately based on usage or so.

<External Electrodes>

The external electrodes 4 may contain any conductive material. For example, the external electrodes 4 may contain a known conductive material, such as nickel, copper, tin (Sn), silver, palladium, platinum, gold (Au), their alloy, and conductive resin. The thickness of the external electrodes 4 is determined appropriately based on usage or so.

<Dielectric Composition>

The main component of the dielectric composition constituting the dielectric layers 2 according to the present embodiment includes strontium (Sr) and tantalum (Ta). The main component also preferably includes Barium (Ba).

The main component of the dielectric composition according to the present embodiment may be expressed by $\{Ba_xSr_{(1-x)})\}_mTa_4O_{12}$ for example.

The value of x is preferably 0.75 or less, more preferably 0.1-0.75 (both inclusive, the same applies hereafter).

The value of m is preferably 1.8-2.2, more preferably 1.9-2.1.

A crystal system of a crystal of the main component of the dielectric composition according to the present embodiment is not limited, but is preferably tetragonal or orthorhombic, and more preferably tetragonal.

The elements excluding oxygen constituting the main component is defined as, for example, a component that occupies 80-100 parts by mol, more preferably 90-100 parts by mol, with respect to 100 parts by mol of elements other than oxygen contained in the dielectric composition.

The dielectric composition according to the present embodiment substantially excludes titanium (Ti), niobium (Nb), alkali metals, and lead (Pb). This means that a total of titanium, niobium, alkali metals, and lead occupies 10 parts by mol or less, preferably 5 parts by mol or less, with respect to 100 parts by mol of the elements other than oxygen contained in the dielectric composition.

The dielectric composition according to the present embodiment may include subcomponents, such as vanadium (V), aluminum (Al), magnesium (Mg), silicon (Si), calcium (Ca), manganese (Mn), chromium (Cr), and rare-earth elements.

The density of the dielectric composition according to the present embodiment is preferably at least 5.72 g/cm$^3$, more preferably 5.75-7.85 g/cm$^3$. Methods to set the density of the dielectric composition within the mentioned range are not limited. Some of such methods are adjusting a firing temperature for the dielectric composition, adjusting the diameter of calcined powder, and adding a sintering aids. A firing temperature to set the density within the mentioned range is preferably 1380-1600° C.

<Method of Manufacturing Multilayer Ceramic Capacitor>

Next, a method of manufacturing the multilayer ceramic capacitor 1 shown in FIG. 1 is explained below.

In the present embodiment, the calcined powder of the main component constituting the dielectric composition is prepared. Raw materials of the elements constituting the main component are not limited, and oxides of the above-mentioned elements may be used. Various compounds used to obtain oxides of each element by firing may also be used.

The raw materials of the main component are weighed to a predetermined ratio and are thereafter mixed in wet manner for a predetermined time using a ball mill or so. The mixed powder is dried and thereafter heated at 700-1300° C. in the air to obtain the calcined powder of the main component. The calcined powder may be pulverized for a predetermined time using a ball mill or so.

Then, a paste for manufacturing green chips is prepared. The calcined powder of the obtained main component, a binder, and a solvent are kneaded and turned into paint to obtain a paste for dielectric layers. The binder and the solvent are known ones.

If necessary, the paste for dielectric layers may include additives, such as plasticizers and dispersants.

A paste for internal electrode layers is obtained by kneading the above-mentioned raw material of the conductive material, a binder, and a solvent. The binder and the solvent are known ones. If necessary, the paste for internal electrode layers may include additives, such as sintering inhibitors and plasticizers.

A paste for external electrodes can be prepared in a similar manner as the paste for internal electrode layers is prepared.

Green sheets and internal electrode patterns are formed using the obtained pastes and are stacked to obtain green chips.

If necessary, the green chips are subjected to a binder removal treatment. As conditions of the binder removal treatment, for example, the holding temperature is preferably 200-350° C.

After the binder removal treatment, the green chips are fired to obtain the element bodies 10. In the present embodiment, the atmosphere of the firing is not limited and may be the air or a reduction atmosphere. In the present embodiment, the holding temperature of the firing is not limited and is, for example, 1300-1600° C.

After the firing, if necessary, the element body 10 is subjected to a reoxidation treatment (annealing). As conditions of the annealing, the oxygen partial pressure of the annealing is preferably higher than that of the firing, and the holding temperature is preferably 1150° C. or lower.

A dielectric composition constituting the dielectric layers 2 of the element body 10 obtained in the above-mentioned manner is comprised of the above-mentioned dielectric composition. The end surfaces of the element body 10 are polished, applied with the paste for external electrodes, and baked to form the external electrodes 4. Then, if necessary, a coverage layer is formed on the surfaces of the external electrodes 4 by plating or so.

The multilayer ceramic capacitor 1 according to the present embodiment is thus manufactured.

Strontium and tantalum being included in the main component enables the dielectric composition according to the present embodiment to have constant and high relative permittivity at a wide range of temperatures. Specifically, a relative permittivity of at least 75 can be observed at a temperature of −55 to +150° C., and a relative permittivity of at least 70 can be observed at a temperature of −70 to +180° C. in accordance with the composition of the present embodiment.

The dielectric composition according to the present embodiment enables a capacitance change to be within ±22% of the capacitance at 25° C. under a temperature range of −55 to +150° C., thus satisfying the X8S standard. The dielectric composition according to the present embodiment also enables a capacitance change to be within ±22% of the capacitance at 25° C. under a temperature range of −70 to +180° C.

The dielectric composition of the present embodiment enables its high density, high relative permittivity, low dielectric loss, and high resistivity, without substantially including titanium, niobium, alkali metals, and lead.

The dielectric composition according to the present embodiment includes tantalum and substantially excludes niobium and titanium. A conventional dielectric composition does not include tantalum and includes niobium and titanium. The dielectric composition according to the present embodiment tends to have higher resistivity and lower dielectric loss compared to the conventional dielectric composition. This may be because tantalum pentoxide ($Ta_2O_5$) is less likely to have oxygen vacancy defects compared to niobium pentoxide ($Nb_2O_5$) and titanium oxide ($TiO_2$).

Dielectric properties being unique to an insulator, the dielectric composition needs to have high resistivity so as not to become a semiconductor or a conductor. As mentioned above, tantalum pentoxide is less likely to have oxygen vacancy defects compared to niobium pentoxide and titanium oxide. This means that changes in the valence of tantalum pentoxide are controlled. Consequently, reduction of the resistivity of the dielectric composition seems to be prevented to enable high resistivity at a wide range of temperatures, and the dielectric loss of the dielectric composition seems to be lowered.

Second Embodiment

<Thin Film Capacitor>

Figure 2:
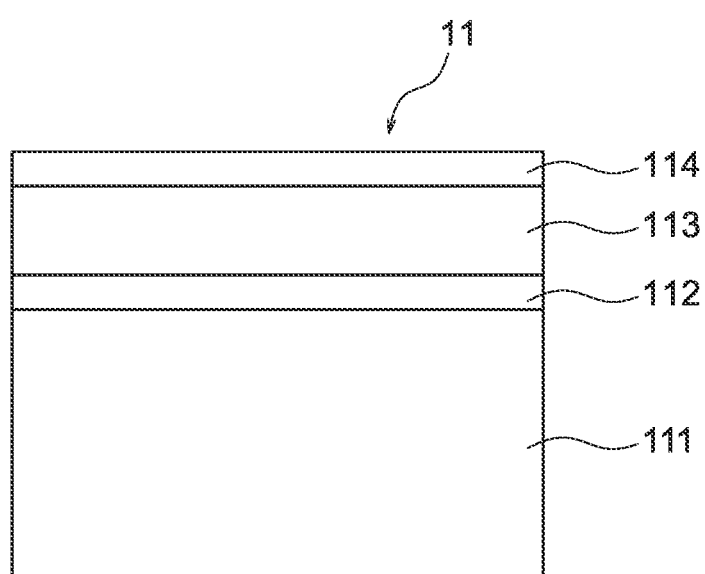
FIG. 2 is a schematic cross-sectional view of a thin film capacitor according to an embodiment of the present invention.

FIG. 2 shows a schematic view of a thin film capacitor according to the present embodiment. The thin film capacitor shown in FIG. 2 includes a bottom electrode 112 and a dielectric thin film 113 on a substrate 111 in the order mentioned, and an upper electrode 114 on the top surface of the dielectric thin film 113.

Although the substrate 111 may be made from any material, a silicon single crystal substrate is suitable material in terms of availability and cost. Nickel foil or copper foil may also be used if flexibility is highly regarded.

The bottom electrode 112 and the upper electrode 114 may be made from any material as long as they function properly as electrodes. Examples of the material include platinum, silver, and nickel. The thickness of the bottom electrode 112 is, for example, 0.01-10 μm, but is not limited to this value. The thickness of the upper electrode 114 is, for example, 0.01-10 μm, but is not limited to this value.

The composition and the crystal system of the main component of the dielectric composition constituting the dielectric thin film 113 according to the present embodiment are the same as those of the first embodiment.

The thickness of the dielectric thin film 113 is not limited, but is preferably 10 nm-1 μm.

<Method of Manufacturing Thin Film Capacitor>

Next, a method of manufacturing the thin film capacitor 11 is explained below.

Methods of forming a thin film that eventually becomes the dielectric thin film 113 are not limited. Examples of such methods include the vacuum deposition method, the sputtering method, the pulsed laser deposition method (PLD), the metal organic chemical vapor deposition method (MO-CVD), the metal organic decomposition method (MOD), the sol-gel method, and the chemical solution deposition method (CSD).

Impurities and/or subcomponents may be included in the material used to form the thin film as long as the amount of the impurities and/or subcomponents is not large to impair the performance of the thin film. The dielectric thin film 113 according to the present embodiment may also include impurities and/or subcomponents as long as the amount of the impurities and/or subcomponents is not large to impair the performance of the dielectric thin film 113.

A method to form the thin film using PLD for the present embodiment is explained below.

The silicon single crystal substrate to be used as the substrate 111 is prepared. Thin films of $SiO_2$, $TiO_x$, and Pt are then formed on the silicon single crystal substrate in the order mentioned, thus forming the bottom electrode 112 made from Pt. Any methods may be used to form the bottom electrode 112. Examples of such methods include the sputtering method and CVD.

The dielectric thin film 113 is then formed on the bottom electrode 112 using PLD. A metal mask may be used to expose a portion of the bottom electrode 112 so that the dielectric thin film 113 is not formed on that portion.

To perform PLD, a target containing elements that constitute the dielectric thin film 113 to be formed is first placed in a film formation chamber. A pulsed laser is then beamed at the surface of the target. With the strong energy of the pulsed laser, the surface of the target vaporizes instantly. The vaporized material is deposited on the substrate facing the target, thus forming the dielectric thin film 113.

The target may be of any type, and may be a sintered metal oxide containing elements that constitute the dielectric thin film 113 to be formed, or an alloy, for example. Although the target preferably has an average element distribution, the distribution may deviate from the average to the extent that the quality of the dielectric thin film 113 to be formed is not impacted.

The number of the target may be one or plural. Multiple targets containing some of the elements that constitute the dielectric thin film 113 may be prepared and used for film formation. The target may have any shape as long as it is suitable for a film formation device.

When PLD is performed, the substrate 111 is preferably heated with an infrared laser upon film formation in order to crystallize the dielectric thin film 113 to be formed. The temperature at which the substrate 111 is heated depends on the elements, composition, etc. of the dielectric thin film 113 to be formed and the substrate 111, and may be 600-800° C. for example. Using an appropriate temperature to heat the substrate 111 enables the dielectric thin film 113 to crystallize easily and prevents cracks from occurring upon cooling.

Forming the upper electrode 114 on the dielectric thin film 113 completes the manufacturing of the thin film capacitor 11. Any material, including silver, gold, and copper, may be used for the upper electrode 114. Any methods, including the vapor deposition method and the sputtering method, may be used to form the upper electrode 114.

Although the embodiments according to the present invention have been explained above, the present invention is not at all limited to these embodiments. The present invention may be put into practice in various forms without departing from the scope of the invention.

Although the above embodiments explain the cases where an electronic component according to the present invention is a multilayer ceramic capacitor or a thin film capacitor, an electronic component according to the present invention is not limited to these two, and may be any other electronic component having the above-mentioned dielectric composition.

For example, an electronic component according to the present invention may be a single plate ceramic capacitor having a pair of electrodes formed on a single layer dielectric substrate comprised of the above-mentioned dielectric composition.

An electronic component according to the present invention may be a filter, a diplexer, a resonator, a vibrator, or an antenna, as well as a capacitor.

Examples

Hereinafter, the present invention is explained in further detail with examples and comparative examples, but is not limited to the following examples.

Experiment 1

<Samples 1 to 5>

In Samples 1 to 5, raw material of each component of compositions having formulas after firing shown in Table 1 were prepared as the starting raw material of a dielectric composition. The prepared starting raw material (powders) was weighed so that the ratio of the metal elements in the composition formulas would be as shown in Table 1.

Next, the weighed powders were mixed in wet manner in a ball mill using ion-exchanged water as dispersion medium, and this mixture was dried to obtain a mixed raw material powder. After that, the mixed raw material powder was heated at 900° C. (holding temperature) for two hours (holding time) in the air to obtain calcined powder of a main component.

The calcined powder of the main component was pulverized in wet manner in a ball mill using ion-exchanged water as dispersion medium, and this mixture was dried to obtain the dielectric raw material.

10 parts by mass of water solution including 6 parts by mass of polyvinyl alcohol resin were added to 100 parts by mass of the dielectric raw material to obtain a granulated powder.

The granulated powder was put into a mold with an inner diameter of $\Phi12$ mm, temporarily press-molded with a pressure of 0.6 ton/cm$^2$, and press-molded with a pressure of 1.2 ton/cm$^2$ to obtain a disc-shaped green body.

The green body was subjected to a binder removal treatment, fired, and annealed under the following conditions to obtain an element body.

As the conditions of the binder removal treatment, the holding temperature was 400° C., the temperature holding time was two hours, and the atmosphere was the air.

As the firing conditions, the holding temperature was 1425-1500° C., the holding time was two hours, and the atmosphere was a humidified N$_2$+H$_2$ mixed gas (the oxygen partial pressure was 10$^{12}$ MPa). A wetter was used for humidification of the atmosphere gas upon firing.

As the annealing conditions, the holding temperature was 1050° C., the temperature holding time was two hours, and the atmosphere gas was a humidified N$_2$ gas (oxygen partial pressure was 10$^7$ MPa). A wetter was used for humidification of the atmosphere gas upon annealing.

The relative permittivity, the dielectric loss (tan δ), the density, the resistivity, and the crystal system of the sintered body (dielectric composition) were measured using the following methods. For the measurement of the relative permittivity, the dielectric loss, and the resistivity, an indium (In)—gallium (Ga) electrode paste was applied to the dielectric composition (sintered body) to obtain a disc-shaped ceramic capacitor sample (capacitor sample).

<Relative Permittivity and Dielectric Loss (tan δ)>

A signal with a frequency of 1 kHz and an input signal level (measurement voltage) of 1 Vrms was applied to the capacitor sample using a digital LCR meter (4284A manufactured by YHP) at a room temperature (20° C.) to measure the capacitance "C" and tan δ. Then, the relative permittivity was calculated using the thickness of the sintered body, the effective electrode area, and the measured capacitance "C". The results are shown in Table 1.

Figure 3:
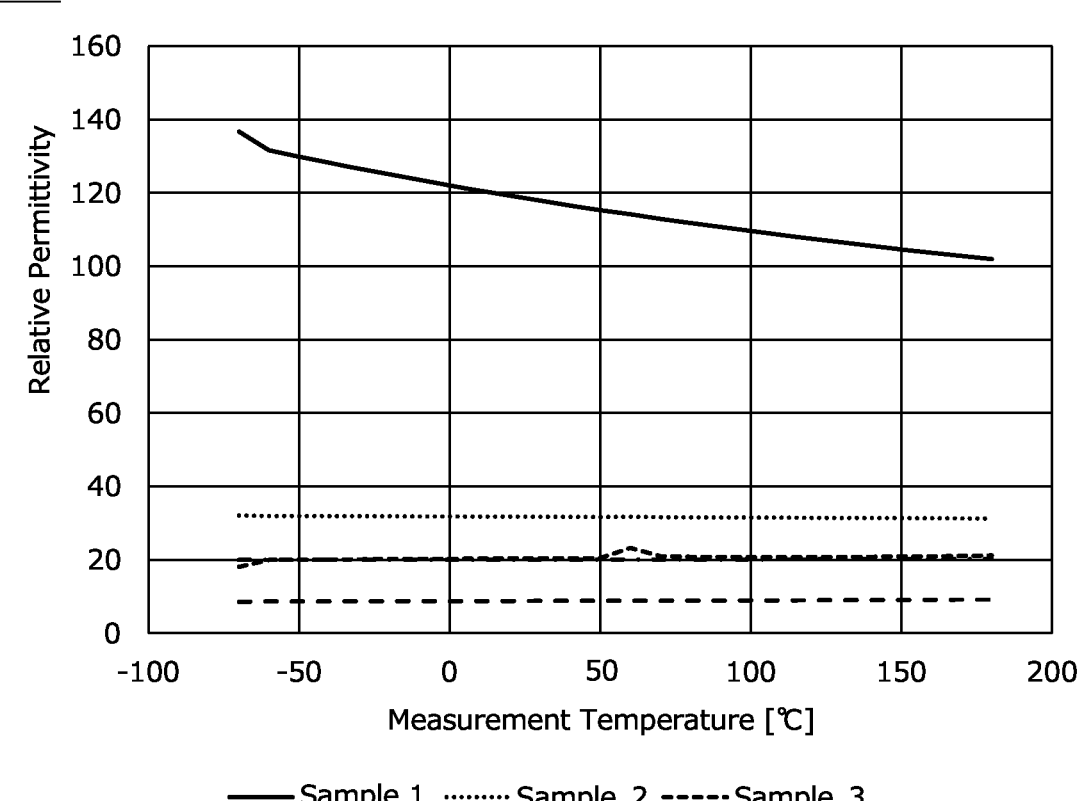
FIG. 3 is a chart showing the relationship between measurement temperatures and relative permittivity of samples 1 to 5.

The relative permittivity was measured between −70 to +180° C. at 10° C. intervals. The results are shown in FIG. 3.

<Density>

The density of the dielectric composition was measured as follows. The volume "V" of the dielectric composition was first calculated. The mass "m" of the disc-shaped dielectric composition was then measured. The density of the dielectric composition was finally calculated by dividing "m" by "V" (m/V). The results are shown in Table 1.

<Resistivity>

The insulation resistance of the capacitor sample was measured using a digital resistance meter (R8340 manufactured by ADVANTEST) at a reference temperature (25° C.). The resistivity was calculated using the insulation resistance, the effective electrode area, and the thickness of the dielectric composition. The results are shown in Table 1.

TABLE 1

| Sample No. | Composition formula | Density [g/cm$^3$] | Relative permittivity | Dielectric loss tanδ | Resistivity [Ω · m] |
|---|---|---|---|---|---|
| 1 | BaSrTa$_4$O$_{12}$ | 7.31 | 119 | 0.0% | 7.0E+12 |
| 2 | Ba$_4$Al$_2$La$_2$Ta$_8$O$_{30}$ | 6.72 | 32 | 0.1% | 1.4E+12 |
| 3 | SrZrO$_3$ | 4.08 | 20 | 9.7% | 1.2E+08 |
| 4 | TaAlO$_4$ | 5.76 | 9 | 0.1% | 4.9E+12 |
| 5 | CaNdAlO$_4$ | 6.43 | 20 | 0.0% | 7.3E+12 |

Samples 1 to 5 are oxides that belong to a polar point group. According to FIG. 3, the relative permittivity of sample 1 including barium, strontium, and tantalum as a main component is at least 100 at a wide range of measurement temperatures (−70 to +180° C.), and is higher than that of other oxides (samples 2 to 5).

According to FIG. 3, the capacitance change of sample 1 is within ±22% of the capacitance at 25° C. under a temperature range of −55 to +150° C., thus satisfying the X8S standard. The capacitance change of sample 1 is also within ±22% of the capacitance at 25° C. under a temperature range of −70 to +180° C.

According to Table 1, sample 1 including barium, strontium, and tantalum as a main component has higher density, higher relative permittivity, lower dielectric loss, and higher resistivity compared to those of other oxides (samples 2 to 5).

Experiment 2

<Samples 21-26, 31-34>

Dielectric compositions of samples 21-26 and 31-34 were obtained using the same method as in Experiment 1 except that the components and the amount of the starting raw materials of the dielectric compositions were as shown below and the holding temperature for firing was 1550° C. The density, relative permittivity, dielectric loss, and resistivity of the dielectric compositions of samples 21-26 and 31-34 were then measured using the same method as in Experiment 1, the difference being as mentioned. The crystal systems were investigated using the method described below. The results are shown in Tables 2 and 3. The relative permittivity of each of samples 21-26 and 31-34 is at least 70 at a temperature ranging from −70 to +180° C.

In Experiment 2, powders of $BaCO_3$, $SrCO_3$, and $Ta_2O_5$ were prepared as the starting raw materials of the dielectric compositions. The starting raw materials were weighed so that the main component after firing, $\{Ba_xSr_{(1-x)})\}_mTa_4O_{12}$, would have the composition shown in Table 2 or 3.

<Crystal System>

Electron diffraction was performed for the dielectric compositions. The electron beam patterns were analyzed to identify the crystal systems.

relative permittivity, dielectric loss, and resistivity of such dielectric compositions (sintered bodies) were then measured accordingly. The results are shown in Table 4 and FIGS. 4-6.

TABLE 4

| Sample No. | Density [g/cm³] | Relative permittivity | Dielectric loss tanδ | Resistivity [Ω · m] |
|---|---|---|---|---|
| 41 | 5.74 | 92 | 17.5% | 8.9E+06 |
| 42 | 6.17 | 92 | 1.7% | 1.3E+09 |
| 43 | 6.78 | 107 | 0.1% | 2.3E+10 |
| 44 | 6.79 | 113 | 0.1% | 1.5E+11 |
| 1 | 7.31 | 119 | 0.0% | 7.0E+12 |
| 45 | 6.97 | 112 | 0.1% | 6.4E+11 |

TABLE 2

| Sample No. | Ba + Sr (m) | Ba ratio (x) | Sr ratio | Ba | Sr | Ta | Density [g/cm³] | Relative permittivity | Dielectric loss tanδ | Resistivity [Ω · m] | Crystal system |
|---|---|---|---|---|---|---|---|---|---|---|---|
| 21 | 2.0 | 0.80 | 0.20 | 1.60 | 0.40 | 4 | 5.92 | 91 | 28.0% | 3.1E+11 | Tetragonal |
| 22 | 2.0 | 0.75 | 0.25 | 1.50 | 0.50 | 4 | 6.03 | 100 | 19.5% | 4.8E+11 | Tetragonal |
| 23 | 2.0 | 0.50 | 0.50 | 1.00 | 1.00 | 4 | 6.89 | 114 | 0.4% | 5.0E+11 | Tetragonal |
| 24 | 2.0 | 0.25 | 0.75 | 0.50 | 1.50 | 4 | 7.05 | 114 | 0.2% | 5.2E+11 | Tetragonal |
| 25 | 2.0 | 0.10 | 0.90 | 0.20 | 1.80 | 4 | 7.04 | 103 | 0.0% | 5.1E+11 | Tetragonal |
| 26 | 2.0 | 0.00 | 1.00 | 0.00 | 2.00 | 4 | 7.06 | 95 | 0.2% | 5.0E+11 | Orthorhombic |

TABLE 3

| Sample No. | Ba + Sr (m) | Ba ratio (x) | Sr ratio | Ba | Sr | Ta | Density [g/cm³] | Relative permittivity | Dielectric loss tanδ | Resistivity [Ω · m] | Crystal system |
|---|---|---|---|---|---|---|---|---|---|---|---|
| 31 | 1.8 | 0.25 | 0.75 | 0.45 | 1.35 | 4 | 5.75 | 92 | 52.0% | 4.2E+11 | Tetragonal |
| 32 | 1.9 | 0.25 | 0.75 | 0.48 | 1.43 | 4 | 5.80 | 104 | 37.5% | 4.7E+11 | Tetragonal |
| 24 | 2.0 | 0.25 | 0.75 | 0.50 | 1.50 | 4 | 7.05 | 114 | 0.2% | 5.2E+11 | Tetragonal |
| 33 | 2.1 | 0.25 | 0.75 | 0.53 | 1.58 | 4 | 5.82 | 102 | 28.1% | 4.3E+11 | Tetragonal |
| 34 | 2.2 | 0.25 | 0.75 | 0.55 | 1.65 | 4 | 5.72 | 91 | 44.2% | 3.0E+11 | Tetragonal |

According to Tables 2 and 3, sample 26 whose main component includes strontium and tantalum as well as samples 21-25 and 31-34 whose main component includes barium, strontium, and tantalum have high relative permittivity.

According to Table 2, samples have higher density, higher relative permittivity, lower dielectric loss, and higher resistivity when the value of x is 0.75 or smaller (samples 22-26) than when the value of x is 0.80 (sample 21).

According to Table 2, samples have higher relative permittivity when the value of x is 0.10-0.75 (samples 22-25) than when the value of x is 0.00 (sample 26).

According to Table 3, samples have higher density, higher relative permittivity, lower dielectric loss, and higher resistivity when the value of m is 1.9-2.1 (samples 32, 24, and 33) than when the value of m is 1.8 (sample 31) or 2.2 (sample 34).

Experiment 3

<Samples 41-45>

The dielectric compositions (sintered bodies) of samples 41-45 were obtained using the same method as was used for sample 1, except that the firing temperature for samples 41-45 varied within a range of 1375-1500° C. The density, According to Table 4 and FIGS. 4-6, samples have lower dielectric loss and higher resistivity when the density is over 5.74 (samples 1, 42-45) than when the density is 5.74 (sample 41).

DESCRIPTION OF THE REFERENCE NUMERALS

1 . . . multilayer ceramic capacitor
10 . . . element body
2 . . . dielectric layer
3 . . . internal electrode layer
4 . . . external electrode
11 . . . thin film capacitor
111 . . . substrate
112 . . . bottom electrode
113 . . . dielectric thin film
114 . . . upper electrode

What is claimed is:

1. A dielectric composition comprising a main component including strontium and tantalum,
wherein the main component is defined as a component that occupies 80-100 parts by mol with respect to 100 parts by mol of elements other than oxygen contained in the dielectric composition, wherein the main component is expressed by $\{Ba_x Sr_{(1-x)}\}_m Ta_4 O_{12}$ and the value of x is 0.75 or smaller, wherein the value of m is 1.8-2.2, and wherein a total of titanium, niobium, alkali metals, and lead occupies 10 parts by mol or less but greater than 0 parts with respect to 100 parts by mol of the elements other than oxygen contained in the dielectric composition.

2. The dielectric composition according to claim 1, wherein the main component further includes barium.

3. The dielectric composition according to claim 1, wherein the value of x is 0.1-0.75 (both inclusive).

4. The dielectric composition according to claim 1, Wherein the value of m is 1.9-2.1 (both inclusive).

5. The dielectric composition according to claim 1, wherein a crystal system of a crystal of the main component is tetragonal.

6. An electronic component comprising the dielectric composition according to claim 1.

* * * * *